United States Patent
Dussap et al.

(10) Patent No.: US 9,395,274 B2
(45) Date of Patent: Jul. 19, 2016

(54) METHOD TO TEST EQUIPMENT WITH VARIABLE GEOMETRIES OF AN AIRCRAFT ENGINE

(71) Applicant: SNECMA, Paris (FR)

(72) Inventors: Matthieu Dussap, Moissy-Cramayel (FR); Antoine Veyrat-Masson, Moissy-Cramayel (FR)

(73) Assignee: SNECMA, Paris (FR)

(*) Notice: Subject to any disclaimer, the term of this patent is extended or adjusted under 35 U.S.C. 154(b) by 0 days.

(21) Appl. No.: 14/551,409

(22) Filed: Nov. 24, 2014

(65) Prior Publication Data

US 2015/0149033 A1    May 28, 2015

(30) Foreign Application Priority Data

Nov. 25, 2013 (FR) ..................... 13 61589

(51) Int. Cl.
*G01M 15/14* (2006.01)
*B64D 47/00* (2006.01)
*G07C 5/08* (2006.01)

(52) U.S. Cl.
CPC ............... *G01M 15/14* (2013.01); *B64D 47/00* (2013.01); *G07C 5/0808* (2013.01)

(58) Field of Classification Search
CPC ..... G01M 15/14; G07C 5/0808; B64D 47/00; F02C 7/232; F02C 7/22
See application file for complete search history.

(56) References Cited

U.S. PATENT DOCUMENTS

| | | | | |
|---|---|---|---|---|
| 4,469,071 | A | * | 9/1984 | Bassi et al. ..................... 123/481 |
| 5,020,564 | A | * | 6/1991 | Thoman ............. G05D 16/2053 137/102 |
| 2007/0107435 | A1 | * | 5/2007 | Bickley .......................... 60/773 |
| 2010/0257867 | A1 | | 10/2010 | Aurousseau et al. |
| 2011/0146823 | A1 | * | 6/2011 | Griffiths et al. .......... 137/625.48 |
| 2015/0027412 | A1 | * | 1/2015 | Henson ......................... 123/457 |

FOREIGN PATENT DOCUMENTS

| | | |
|---|---|---|
| FR | 2 923 871 A1 | 5/2009 |
| FR | 2 942 001 A1 | 8/2010 |
| FR | 2 979 957 A1 | 3/2013 |
| RU | 2094327 C1 * | 10/1997 |

OTHER PUBLICATIONS

French Preliminary Search Report and Written Opinion issued Jul. 28, 2014 in Patent Application No. FR 1361589 (with English Translation of Category of Cited Documents).

* cited by examiner

*Primary Examiner* — Rodney Butler
(74) *Attorney, Agent, or Firm* — Oblon, McClelland, Maier & Neustadt, L.L.P.

(57) ABSTRACT

The invention relates to a method for testing equipment with variable geometries of an aircraft engine, especially turbomachine. In a first phase, a computer tests the chain of controls of the fuel dosage function. In a second phase, said computer tests the jacks of the chains of controls of equipment with variable geometries by keeping the aircraft shut-off valve open during rod extensions of jacks and by controlling the injection shut-off valve to expel fuel into the injection chamber during their rod retractions.

11 Claims, 5 Drawing Sheets

ROD RETRACTATION

ROD EXTENSION

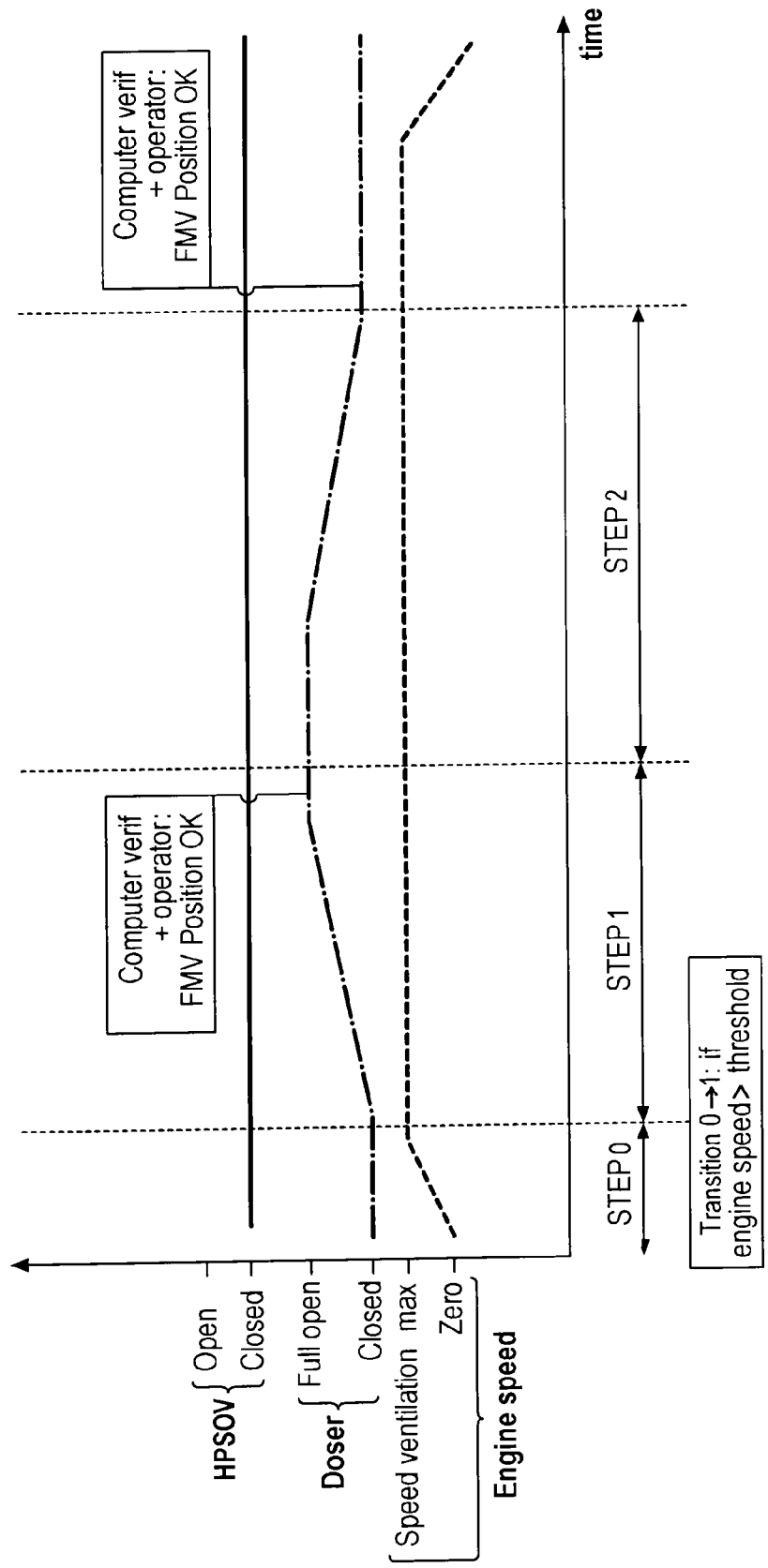

METHOD TO TEST EQUIPMENT WITH VARIABLE GEOMETRIES OF AN AIRCRAFT ENGINE

The present invention relates to a method for testing equipment with variable geometries of an aircraft engine and in particular a turbomachine engine.

TECHNICAL FIELD

Generalities

To operate optimally, a turbomachine needs to adapt its internal pressure ratios. For this reason, it has mobile equipment or equipment of "variable geometries" (GV), adjustment of which enables this adaptation as a function of the operating point in the field of flight.

Such equipment with variable geometries can be actuated hydraulically, by means of jacks to which it is connected by means of kinematics.

Hydraulic control equipment on an engine is traditionally:
valves for controlling the inclination of the blades of the high-pressure compressor ("Variable Stator Valves" or "VSV");
bleed valves ("Variable Bleed Valves" or "VBV"), such as gateways which discharge the high-pressure compressor in some flight phases;
metering valves ("Fuel Metering Valves" or "FMV") such as the fuel doser enabling injection of a certain rate into the combustion chamber.

As is shown in FIG. 1, the jacks V which constitute these various items of equipment are generally pressure-fed by the fuel system of the aircraft, which comprises for this purpose a Low-Pressure part BP (around 10 bars) and a High-Pressure part HP (around 40 bars). The movement of a jack V is controlled by a servovalve SV which moves the piston of said jack V by connecting a chamber of this jack V to the High-Pressure zone HP (in the figure, chamber C1), while the other chamber is connected to the Low-Pressure zone BP (in the figure, chamber C2). This servovalve is in turn controlled by the computer CM which controls the engine.

As is illustrated in simplified form in FIG. 2, a fuel system traditionally comprises:
A high-pressure volumetric pump HPP to ensure the fuel rate which the fuel system needs to ensure its principal functions, and in particular to
inject fuel into the injection chamber, via the injectors I, and
supply the rate necessary for movement of the different hydraulic actuators (jacks VSV and VBV; metering valve FMV; etc. . . . );
A low-pressure pump LPP for raising the pressure received from the tanks R of the fuel system of the aircraft to attain acceptable pressure for the high-pressure pump HPP situated downstream;
A bypass valve BP for recirculating the rate supplied by the pump
HPP which is used neither by the injectors I nor by the jacks VSV and VBV;
A doser FMV which moves and regulates the rate sent to the injection chamber, said doser being piloted by the computer CM;
An aircraft fuel shut-off valve FSOV ("Fuel Shut Off Valve");
A shut-off valve HPSOV, for closing the fuel inlet to the injectors I;
Different servovalves SV for directing the HP or BP pressure from the good side of the mobile elements (jacks VSV or VBV, doser FMV, shut-off valve HPSOV) so as to control them.

Reminders of the Maintenance Needs on the Ground

There are different types of maintenance operations on an engine on the ground:
operations for planned maintenance, corresponding to operations which must be performed periodically on the engine;
maintenance operations requested by the pilot or the maintenance team following an engine event felt up in the cockpit.

The aim of this maintenance (maintenance "on condition") is to:
1) confirm the existence of the breakdown: the observation conditions of this breakdown must therefore be reproduced on the ground;
2) diagnose the origin of the breakdown and change the defective equipment;
3) validate repairs undertaken.

For this purpose, the operator has:
on the one hand tests to cover these three aims, for which he initiates a specific logic onboard the computer to control the various items of equipment of the engine;
on the other hand specific tools for "manually" detecting anomalies not detected by the monitoring system of the engine.

In addition to aims 1, 2 and 3 mentioned hereinabove, these tests and tools must cover the following needs:
4) guarantee the safety of the operator: it is imperative that the developed test causes no engine event not provided by the test (ex.: combustion or unwanted engine startup);
5) provide any added deterioration of the engine (new need detected vis-à-vis preceding programs).

The aim consequently is to be able to have test logics for reliably and completely testing the chain of controls of equipment with variable geometries actuated via a hydraulic power source. The proposed tests must respond in particular to aims 1 to 5 mentioned hereinabove.

The equipment affected by these tests is especially the following:
the hydraulic jacks and the kinematics actuating equipment with variable geometries,
the position sensors of the hydraulic jacks actuating equipment with variable geometries,
the servovalves moving the jacks,
the units for controlling these servovalves,
the operation of the different flaps and pumps.

However, the movement of these jacks causes some hydraulic problems as a function of the architecture of engine and aircraft fuel systems.

Displacement of Equipment with Variable Geometries

A usual way to control hydraulic jacks is to shift their piston P from one mechanical stop B to the other. To perform this movement, the jacks need power: in this case fluid (fuel) pressure which enlivens them. The simplest way to provide this power is to create ventilation, that is, turn the engine with the starter (S in FIG. 2), which will drive the pumps fuel LPP and HPP and accordingly provide pressure to the system so that it can animate the jacks.

However, during displacement of a jack housed in a system filled with liquid (in this case fuel), the volume of liquid in the system varies by the same value as the volume of the rod which is retracted or which extends. When the rod retracts into the jack for example, it occupies a volume previously occupied by fuel. Inversely, when a rod extends out, it frees up the space occupied by the fuel. So, when the rod is retracted into or extended from a jack, the system compresses or decompresses by volume equal to that of the rod.

The drawings of FIGS. 3a and 3b illustrate this volume modification phenomenon during retraction or extension of the rod into or from a jack.

Therefore:

If the volume of the system remains constant, the pressure of the fuel will increase under the effect of the reduction in volume reserved for it. This can result in either pressures not acceptable by the system equipment, or blockage of the jack which would not conclude the maintenance test.

If the volume of the system rises (or if the system rejects or admits fuel), the pressure cannot increase, and fuel will be displaced in this added volume or outside the system.

These effects are unwanted because they mean either designing equipment which can resist pressures generated during rod retractions, or adding equipment (shock absorber type, for example) which encloses the volume of displaced fuel.

SUMMARY OF THE INVENTION

An aim of the invention is to propose a solution which aspirates or evacuates fuel as a function of the direction of displacement of rods without using additional equipment.

Another aim of the invention is to propose a solution of this type which does not have to return fuel to the aircraft tanks during rod retractions and can be utilised with systems for which the fuel system is isolated in the direction of the engine to the tank when the engine is stopped and tests on the ground are conducted.

Yet another aim of the invention is to propose a generic solution, applicable irrespective of the interfacing of the aircraft fuel system with the fuel system engine.

Yet another aim of the invention is to propose a solution which conducts the tests on the chain of controls of equipment with variable geometries, while the engine is shut off.

When the engine is shut off in fact, the procedures to be put into place for maintenance operations are far less complex than those necessary when the engine is ignited (ex.: ensuring a security perimeter around the aircraft, moving the aircraft to a specific area . . . ).

A test engine shut off contributes a real advantage for maintenance of engines (decrease in costs and time of operation execution).

Yet another aim is to propose a solution which limits the quantity of fuel injected into the injection chamber, to minimise combustion risks during the test (hot engine or failures on the spark plugs) and limit the number of ventilations necessary to dry the injection chamber between two cycles.

Yet another aim of the invention is to propose a solution which performs the tests even though time availability of the jacks is limited. The decrease in time of availability of jacks (time during which the hydraulic pressure necessary for movement of the jacks is available) in fact needs to accelerate the movement of the jacks to enable them to travel their entire mechanical range of displacement. If the movement of these jacks increases, the rates of expulsion (controlled via the doser) and fuel admission are also impacted.

Yet another aim of the invention is to propose test logics for preventing any additional deterioration of the system in case of breakdown.

Therefore, according to a first aspect, a method for testing equipment with variable geometries of an aircraft engine is proposed, especially a turbomachine, said equipment being controlled hydraulically by means of a fuel system comprising a low-pressure circuit, a high-pressure circuit, an aircraft shut-off valve capable of being closed to isolate these circuits of the fuel tank or fuel tanks, an injection shut-off valve capable of being closed to isolate the high-pressure circuit of the injection chamber of the engine, as well as at least a doser to regulate the rate sent to the injection chamber, characterized in that:

in a first phase, a computer tests the fuel dosage function, the aircraft shut-off valve being alternatively open or closed, and in a second phase, said computer tests the jacks of equipment with variable geometries with the aircraft shut-off valve open during rod extensions of jacks and by controlling the injection shut-off valve to expel fuel into the injection chamber during their rod retractions.

It is understood in fact that the fuel doser is integrally immersed in the fuel circuit: the movement of this "jack" consequently generates no overpressure (the volume of fuel contained in the enclosure containing the jack being constant: there is no need to admit or eject fuel from the engine fuel circuit). It is therefore unnecessary to evacuate fuel from the fuel circuit in the combustion chamber as opposed to the test on the jacks VBV, VSV. This test can therefore be performed without injecting fuel into the chamber, upstream of the test on the jacks VSV and VBV, which limits the quantity injected.

It is also necessary to perform the doser test before the jack test, as the test on the jacks VBV and VSV have to be conducted only if the doser is operating.

Such a test logic also conducts test phases, whereas the engine is shut off, the pressure in the fuel circuits being assured by a starter.

Such a test method is also advantageously completed by the following different characteristics taken alone or in all their possible combinations:

during the first phase, the injection shut-off valve is kept closed and the computer controls the doser to shift it from a closed position to a fully open position, then from this fully open position to its closed position;

during the second phase, the computer executes the following different steps:
  in a first step, it actuates the doser to move it from a closed position to a position letting it expel a given quantity of fuel, then it actuates the shut-off valve of the injection chamber to shift it from its closed position to its open position;
  in a second step, the jacks are actuated to shift from their rod extension position to their rod retraction position.

during the second phase also:
  in a third step, the shut-off valve of the injection chamber is toggled into a closed position and the doser is toggled into a rest position while the jacks are kept in a rod retraction position;
  in a fourth step, the jacks are actuated to shift from their rod retraction position to their rod extension position;

the aircraft fuel valve is open throughout the second test phase at least;

the computer verifies the position of the jacks actuated on completion of each of the different steps;

the computer determines the distances between the controlled displacements and the positions of rods and jacks;

in a step prior to each of the phases, the starter is ramped up, with transition to the other steps being authorised by the computer only if acquisition of the engine speed is valid and the power of this engine speed is greater than the threshold on completion of this prior phase;

during the second phase, the computer authorises moving from the first to the second step only if acquisition of the position of the shut-off valve is valid and if this valve is in an open position while acquisition of the position of the doser is also valid and the latter is in a position enabling a given minimum rate;

during the second phase, the computer controls the servo-valves which control the jacks so that the rate to be expelled generated by the movement of the jack is less than the rate ejected in the injection chamber.

PRESENTATION OF FIGURES

Other characteristics and advantages of the invention will emerge from the following description which is purely illustrative and non-limiting and must be viewed in conjunction with the appended figures, in which:

FIG. 1 schematically illustrates the low-pressure and high-pressure feed of a jack;

FIG. 2 is a simplified diagram of an example of fuel engine system and lines of an aircraft fuel system at the inlet of the latter;

FIGS. 3a and 3b schematically illustrate the volume modification during the retraction or rod extension of a jack;

FIG. 4 is a time scheme illustrating over time different control steps of different actuators of the fuel system for testing the dosage function of the fuel;

DESCRIPTION OF ONE OR MORE EMBODIMENTS

Figure 1:
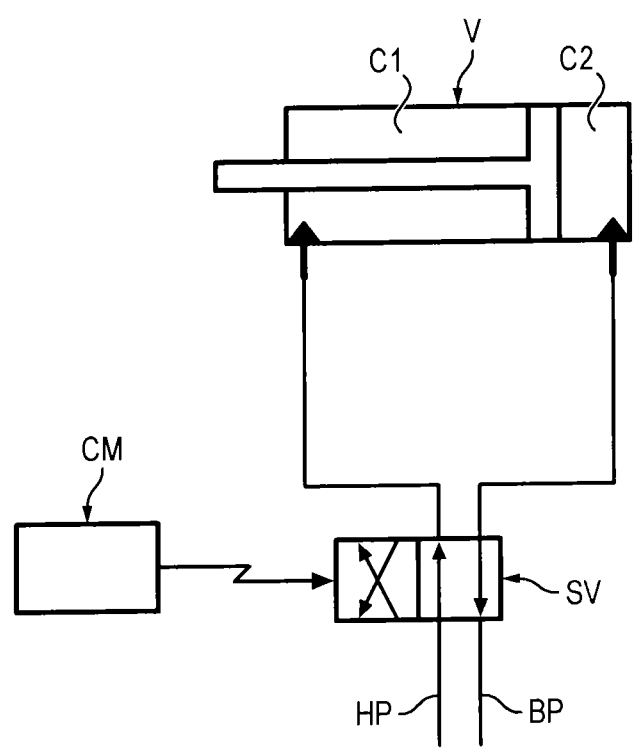
Figure 2:
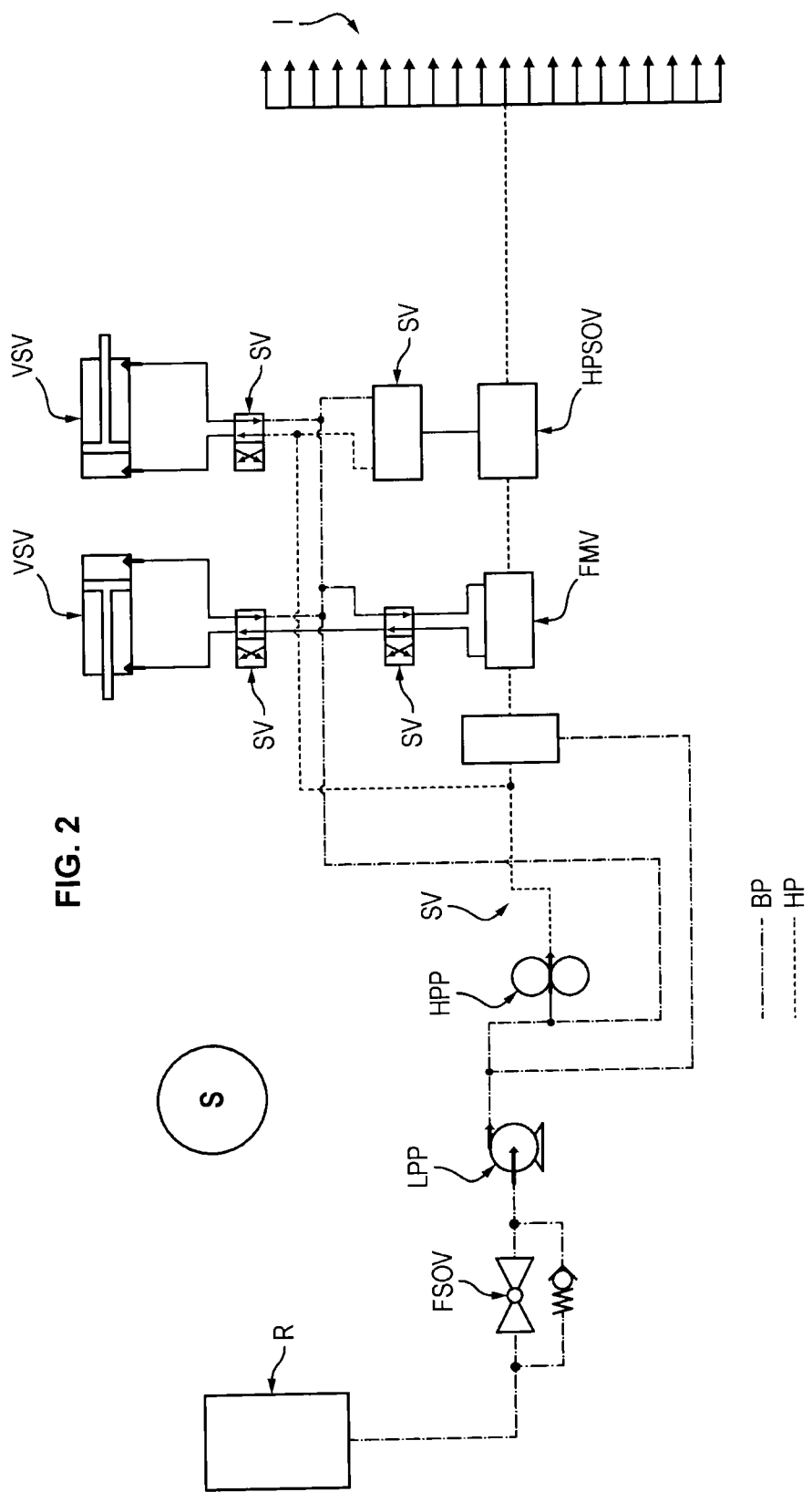
Figure 3A:
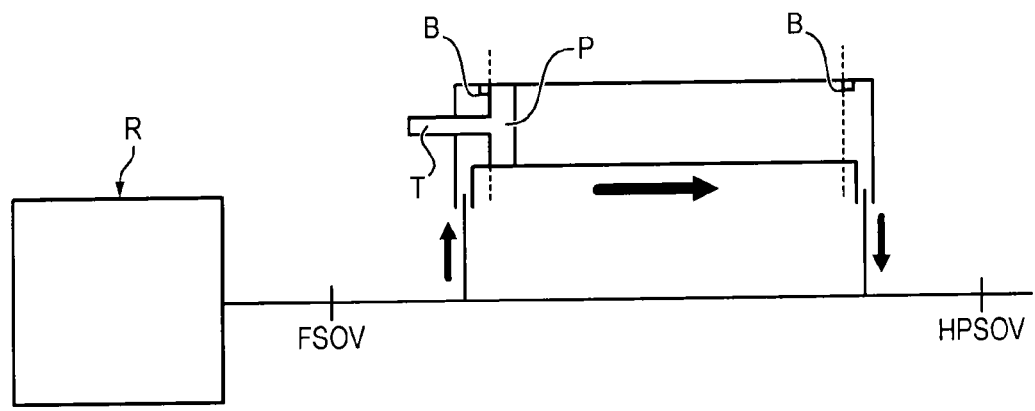
Figure 3B:
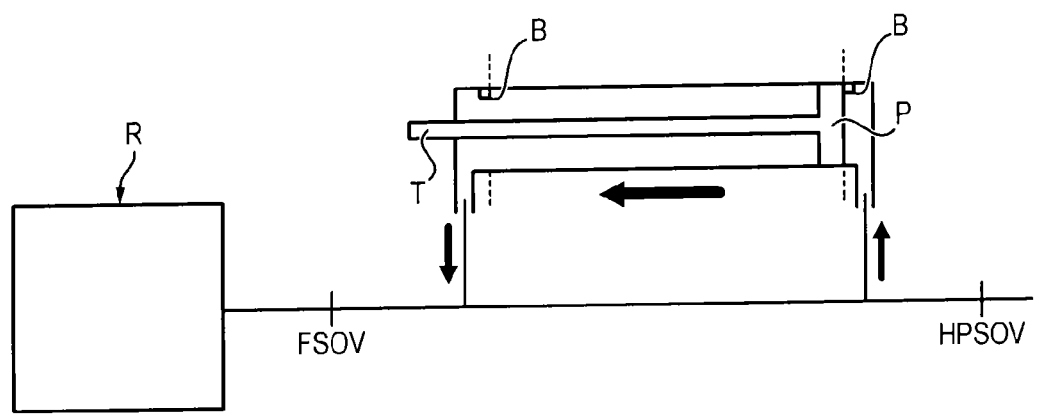

The test example which is described hereinbelow is run on a fuel system which is similar to that illustrated in FIG. 2 and also comprises a sealing flap which is located at the inlet of the engine lines and prevents fuel from returning to the tanks.

Also, the engine is assisted by a starter S, the use of which needs to ensure that:

the starter speed is greater than the unblocking speed of the jacks and the length of time the speed is held lets jacks describe the out-and-back motion necessary for the tests to be run.

The engine computer CM successively executes:

test logic of the chain of controls of the fuel dosage function, then test logic of the chains of controls of equipment with variable geometries.

Test Logic of the Fuel Dosage Function

This test logic mainly performs three steps which are those illustrated in FIG. 4, acting as the engine speed of the starter S, the position of the doser FMV, and the position of the valve HPSOV.

During these different steps, no fuel is injected into the injection chamber, and the valve HPSOV is controlled to be in closed position throughout the fuel dosage function test.

Step 0: this step consists of carrying out dry ventilation. The starter S then drives the engine with power which progressively attains the maximal power which the starter S can deliver. The pumps fuel HPP and LPP are also powered. When the power is sufficient, it becomes possible to move the jacks, and especially that of the doser FMV, by activating the valves SV of the fuel system.

Throughout this step of rise in power, the servovalve which controls the doser FMV is controlled so that the latter is in a closed position which controls the flap HPSOV being controlled to keep the latter in a closed position.

Step 1: the engine is kept by the starter S at the level of power attained on completion of step 0, while the computer CM controls the servovalve of the doser FMV to move the latter into the fully open position.

It is evident that the transition from step 0 to step 1 is authorised by the computer CM only if the following two conditions are verified:

acquisition of the engine speed is valid, AND the engine speed is greater than a predetermined threshold (minimum power threshold for powering the jacks).

If these conditions are not verified, the test stops (end of the starter controls) and the computer displays a message indicating the cause of the breakdown to the operator.

Step 2: during this third step, the computer CM controls the doser FMV to bring it into a closing position. The flap HPSOV remains closed, while the engine speed is still held at the level attained on completion of step 0.

Such sequencing tests the entire chain of controls of the fuel dosage function.

In particular, verifications are made respectively on completion of step 1 and step 2.

At the time of these verifications, the computer CM verifies the distances between the controls of displacements of jacks and the real positions of their rod. The result is sent directly to the operator. Monitoring verifies in particular:

the capacity of the computer to control the actuators (HPSOV, FMV) in a certain position (generation of control current and capacity for regulation);

the capacity of the actuators to reach a requested position (HPSOV, FMV).

As is understood, within the scope of the sequencing just described only the capacity of the valve HPSOV to retain a closed position is tested.

Also, during these verifications also the operator manually compares the values supplied by the position sensors after the piston of the jack has reached each of its mechanical stops with the real expected values.

This comparison verifies the validity of data acquired by the positioning sensors of the actuators (HPSOV, FMV).

Test Logic of Actuators VBV and VSV

During this part of the test, the aircraft fuel admission valve (FSOV) is open so as to aspirate fuel during the rod extension of the jacks.

It is evident that some aircraft by default have this valve open, which would simplify the logic put into place.

Figure 5:
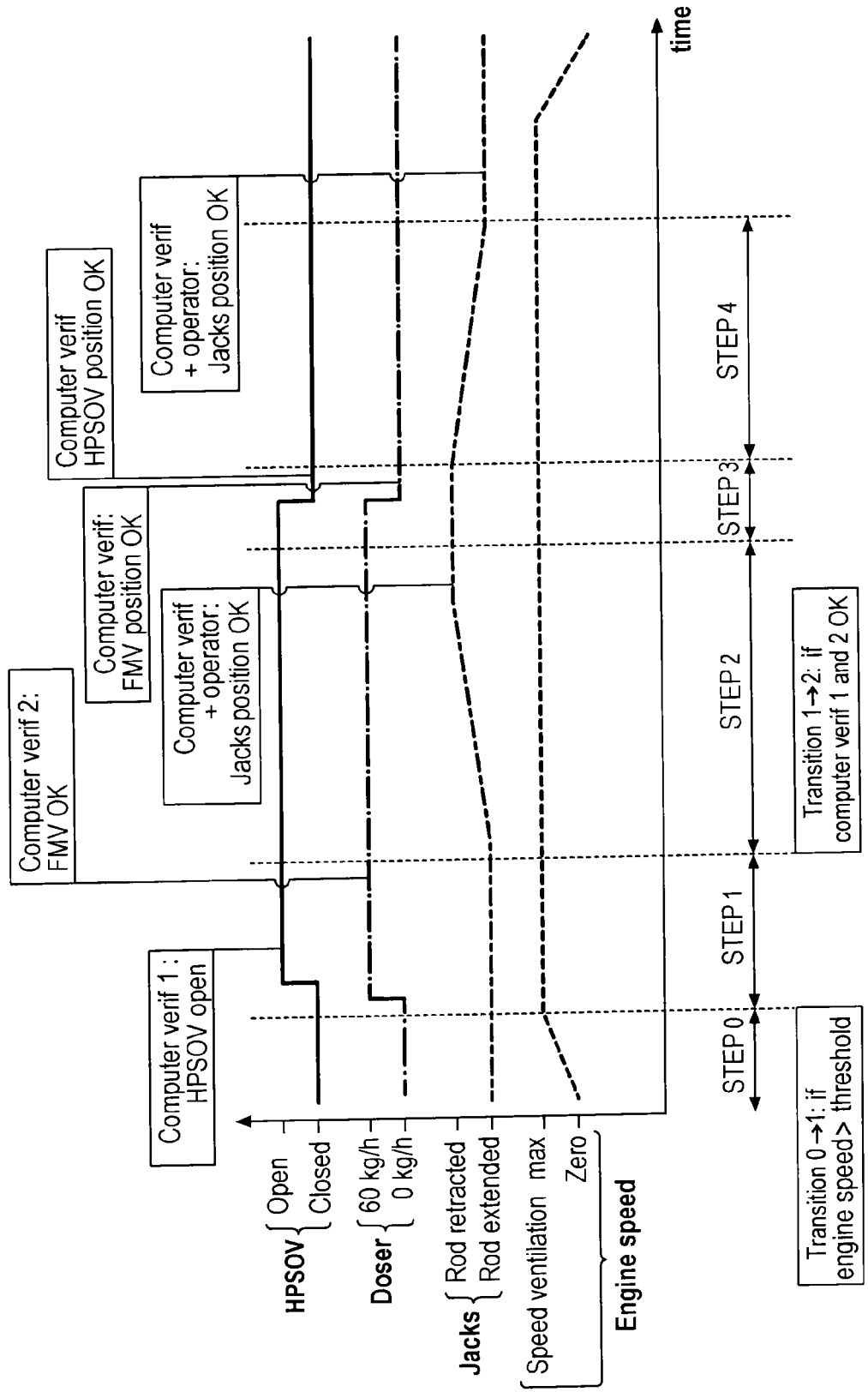
FIG. 5 is a time scheme illustrating over time different control steps of different actuators of the fuel system during the test phase of chains of controls of equipment with variable geometries of a turbomachine.

The test logic of the different jacks VBV or VSV is the following (FIG. 5):

Step 0: the computer CM controls humid ventilation by powering the engine via the starter S and powering the fuel pumps LPP and HPP.

The starter S contributes the power to move the jacks and enable activation of the valves of the fuel system.

The doser FMV is controlled in a closed position and the valve HPSOV also, with the injectors I injecting fuel into the injection chamber.

The computer CM variously controls the fuel circuit as a function of the retraction and rod extension phases of the jacks VBV or VSV:

Retractation of Rod

The fuel must be expelled from the system to avoid a rise in pressure. The computer CM then performs the following steps:

Step 1: The aim of this step is to place the engine in a configuration in which fuel is injected into the combustion chamber.

For this, the computer CM controls:
maintaining the tested jacks in their rod extension positions; the positioning of the doser FMV in a position Xmin for expelling a minimal quantity of fuel into the chamber;
opening the valve HPSOV.

It is evident here that transition from step 0 to step 1 is authorised by the computer CM only if the following conditions are verified:
acquisition of the engine speed is valid, AND
the engine speed is greater than a predetermined threshold.

If these conditions are not verified the test stops (end of the starter controls) and the computer displays a message indicating the cause of the breakdown to the operator.

On completion of this step 1, the computer CM verifies that the valve HPSOV is open and the doser FMV assumes the expected position.

Step 2: During this step, the jacks VBV and VSV are actuated so that their rods move into their retraction position, while the valve HPSOV is held open and the doser FMV is held in the controlled position in step 1.

It is evident here that the servovalves which control the different jacks are controlled so that movement of the rods of the latter does not exceed a critical speed. It should in fact be ensured that the rate to be expelled generated by movement of the jacks is less than the rate ejected into the chamber.

Also, transition from step 1 to step 2 is authorised by the computer only if the following conditions are verified:
Acquisition of the position of the HPSOV is valid and the latter is in an open position, AND
Acquisition of the position of the doser is valid and the latter is in a position Xmin.

If these conditions are not verified, the test stops (end of the starter controls) and the computer displays a message indicating the cause of the breakdown to the operator.

During step 2, the computer CM verifies that the rods of the jacks VBV and VSV are in their controlled position.

Also, the operator can carry out visual verification of the type described later on.

Extension of Rod

Step 3: The valve HPSOV and the doser FMV are again in a closed position. In this way, the quantity of fuel injected into the chamber throughout the test is limited.

Also, continuous tracking of the position of the aircraft fuel valve is done such that the fuel circuit admits fuel and avoids the phenomena of fuel vaporisation which could especially prematurely degrade the pumps.

On completion of this step, the computer CM verifies the positions of said valve and said doser FMV.

Step 4: The jacks VBV and VSV are controlled to toggle back into "rod extension" position.

On completion of this step, the computer CM and the operator verify the positions of the jacks.

Once this "rod extension" position is reached, the test is terminated and the starter stopped.

Such sequencing tests the chains of controls of equipment with variable geometries VBV and VSV and especially the following functions:
capacity of the computer CM to control the actuators (VBV, VSV) in a certain position (generation of control current and regulation capacity);
capacity of actuators to reach a requested position (VBV, VSV);
validity of data acquired by the positioning sensors of the actuators (VBV, VSV).

As in the case of the chain of controls of the dosage function, the first two functions are tested by tracking the distance breakdowns between the controls and the position of the jack rods. The result of this monitoring is directly sent by the computer CM to the operator. The third function is carried out manually by the operator by comparing the value supplied by the sensor when the jack reaches each of its mechanical stops with the real value.

Protections Intended to Prevent Deterioration of Equipment

The test described hereinabove is intended to confirm the existence of a breakdown. Its realisation goes through coordination by the computer of the different control members. If this coordination can no longer be assured, there is the risk of deterioration of the system.

To pre-empt this risk, two levels of security have been implemented to verify that the system shows neither breakdown presenting risks for the operator nor breakdown which might deteriorate the system:
at the start of the test (test acceptance conditions),
during the test (test stop conditions).

a/ Test of the Fuel Dosage Function

| | Test of the chain of controls of the doser | |
|---|---|---|
| | Logic | Justification |
| Test acceptance conditions | Valid acquisition positions HPSOV AND FMV AND | Avoid additional breakdowns making diagnosis of the operator more difficult |
| | HPSOV closed AND | Avoid risk of injection of fuel if the valve HPSOV is blocked open |
| | No breakdown on the control member of the spark plugs | Safety of the operator (no spark plug failure during the test) |
| Test stop conditions | Current distance controlled/current generated OR distance position/warning HPSOV OR | Impossible to control closing of the valve HPSOV → Injection of fuel into the chamber |
| | Invalid acquisition position HPSOV OR open OR | Injection of fuel into the chamber |
| | Breakdown on the control member of the spark pluqs | Safety of the operator (no spark plug failure during the test) | b/ Test of the Capacity to Control the VBV and VSV

The risks of deterioration depend on the test phase:
1. Retraction of rod: This phase needs to expel fuel. If some constraints are not respected, there is the risk of a rise in pressure of the fuel circuit and therefore deterioration of much of the equipment.
2. Extension of rod: This phase needs to admit fuel. If this admission is not assured, there is the risk of cavitation of pumps (appearance of gas in the circuit) and therefore the risk of deterioration of equipment.

The different associated constraints can be summarised as follows:
1. During the retraction phase of rods, it is necessary to open the valve HPSOV and open the doser FMV to the minimum. There should consequently be a computer logic for detecting breakdowns on this equipment and stopping the test, so as to
pre-empt any risk of poor controls of the doser FMV and of the valve HPSOV;
have hydraulic power necessary to control them, as a lack of power could result in poor synchronisation of the opening of the valve HPSOV with displacement of the jacks.

2. For efficacious control of the course of the jacks, the rate exiting (and therefore the opening of the doser FMV) and the speed of the jacks must be correlated: any breakdown affecting the speed of the jacks must be detected.
3. The valve FSOV must absolutely be open during the test; it should therefore be avoided for the valve FSOV to block in the closed position or close during the test.

These different risks, linked to the security of the system, and the risks linked to the safety of the operator are managed via the following acceptance and test stop conditions.

| | Test of chains of controls of equipment with variable geometries VBV and VSV | |
|---|---|---|
| | Logic | Justification |
| Test acceptance conditions | Acquisition shut-off fuel control valid and in "fuel on" position AND Acquisition FSOV valid and open AND | Risk 3 |
| | Acquisition of positions of members FMV, VBV, VSV and of the flap HPSOV valid AND | Risks 1 and 2 |
| | No breakdown on the control member of the spark plugs | Safety of the operator (no spark plug failure during the test) |
| Test stop conditions | The engine cannot receive fuel coming from the aircraft Acquisition shut-off fuel control invalid OR in "fuel off" position OR Acquisition FSOV invalid OR closed OR | Risk 3 |
| | Current distance controlled/ current generated OR distance position/warning on the VBV OR VSV OR FMV OR HPSOV OR | Risks 1 and 2 |
| | Acquisition positions VBV OR VSV OR FMV OR HPSOV invalid OR | Risks 1 and 2 |
| | Breakdown on the control member of the spark plugs | Safety of the operator (no spark plug failure during the test) |

The invention claimed is:

1. A method for testing an equipment of an aircraft engine, said equipment having variable geometries and being controlled hydraulically by a fuel system comprising a low-pressure circuit, a high-pressure circuit, an aircraft shut-off valve capable of being closed to isolate said circuits from at least one fuel tank, an injection shut-off valve capable of being closed to isolate the high-pressure circuit from an injection chamber of the aircraft engine, and a doser to regulate a rate of fuel sent into the injection chamber, the method comprising:
   in a first phase, testing, using a computer, the doser while the aircraft shut-off valve is either open or closed; and
   in a second phase, testing jacks of equipments having variable geometries using said computer while the aircraft shut-off valve is open and during rod extension of said jacks,
   wherein the second phase comprises controlling the injection shut-off valve so as to eject fuel into the injection chamber during rod retraction of said jacks.

2. The method according to claim 1, wherein pressure in the fuel circuits is maintained by a starter and wherein the engine is shut off during the testing steps.

3. The method according to claim 1, wherein during the first phase, the injection shut-off valve is kept closed and the computer controls the doser to have said doser shift from a closed position to a fully open position, then from said fully open position to said closed position.

4. The method according to claim 1, wherein during the second phase, the computer executes the following different steps:
   in a first step, actuating the doser to have said doser shift from a rest position to a position allowing the doser to expel a given quantity of fuel and actuating the shut-off valve of the injection chamber to have said valve shift from the closed position to the open position; and
   in a second step, actuating the jacks to shift from an extended rod position to a retracted rod position.

5. The method according to claim 4, further comprising:
   in a third step, toggling the shut-off valve of the injection chamber into a closed position and toggling the doser in a rest position while the jacks are kept in the retracted rod position;
   in a fourth step, actuating the jacks to shift the jacks from the retracted rod position to the extended rod position.

6. The method accord ng to claim 4, wherein the aircraft shut-off valve is open at least throughout the second test phase.

7. The method according to claim 3, wherein the computer verifies the position of the jacks actuated on completion of each of the different steps.

8. The method according to claim 1, wherein the computer determines distances between displacements controlled and positions of the rods and jacks.

9. The method according to claim 2, further comprising a prior phase prior to each of the testing phases,
   wherein the prior phase comprises a step of ramping up the starter, and
   wherein the other steps are authorized by the computer only if acquisition of an engine speed is valid and if power of said engine speed is greater than a threshold on completion of the prior phase.

10. The method according to claim 4, wherein, during the second phase, the computer authorizes a shift from the first to the second step only if acquisition of the position of the shut-off valve is valid and if the shut-off valve is in an open position while acquisition of the position of the doser is also valid and the doser is in a position allowing a given minimum rate.

11. The method according to claim 1, wherein, during the second phase, the computer controls servovalves which control the jacks so that a rate to be expelled generated by movement of the jack is less than a rate ejected into the injection chamber.

* * * * *